United States Patent
Yeo et al.

(10) Patent No.: US 8,379,695 B2
(45) Date of Patent: Feb. 19, 2013

(54) APPARATUS AND METHOD FOR RECEIVING SIGNAL USING RAKE RECEIVER AND EQUALIZER IN WIRELESS COMMUNICATION SYSTEM

(75) Inventors: Soo-Bok Yeo, Suwon-si (KR); Kwang-Man Ok, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 12/787,581

(22) Filed: May 26, 2010

(65) Prior Publication Data
US 2010/0303141 A1 Dec. 2, 2010

(30) Foreign Application Priority Data
May 29, 2009 (KR) .................. 10-2009-0047334

(51) Int. Cl.
*H04B 1/10* (2006.01)
*H04L 1/02* (2006.01)
(52) U.S. Cl. ......... 375/148; 375/144; 375/347; 375/349
(58) Field of Classification Search .................. 375/144, 375/148, 230, 232, 346, 347, 349, 350
See application file for complete search history.

(56) References Cited

U.S. PATENT DOCUMENTS

| | | | | |
|---|---|---|---|---|
| 6,028,901 A * | 2/2000 | Huynh et al. | ................ | 375/350 |
| 7,899,134 B2 * | 3/2011 | Grossman et al. | ............ | 375/316 |
| 2002/0172166 A1 * | 11/2002 | Arslan et al. | .................. | 370/317 |
| 2004/0240531 A1 | 12/2004 | Black et al. | | |
| 2011/0244905 A1 * | 10/2011 | Burstrom et al. | ............. | 455/507 |

* cited by examiner

*Primary Examiner* — David B Lugo
(74) *Attorney, Agent, or Firm* — Jefferson IP Law, LLP

(57) ABSTRACT

An apparatus and a method for selecting a receiver for demodulating a reception signal at a reception end having a plurality of receivers are provided. The method includes determining, a mean and a standard deviation of Signal-to-Noise Ratios (SNRs) of the receivers are determined, estimating a Doppler frequency, determining a statistical value of a modulation order of subframes received in advance, determining SNR estimation values of the receivers based on the determined mean and standard deviation of the receivers, the estimated Doppler frequency, and the determined statistical value of the modulation order of the received subframes, selecting one receiver having a largest SNR estimation value among the determined SNRs of the receivers, and demodulating a reception signal using the selected receiver.

18 Claims, 5 Drawing Sheets

APPARATUS AND METHOD FOR RECEIVING SIGNAL USING RAKE RECEIVER AND EQUALIZER IN WIRELESS COMMUNICATION SYSTEM

PRIORITY

This application claims the benefit under 35 U.S.C. §119(a) of a Korean patent application filed in the Korean Intellectual Property Office on May 29, 2009 and assigned Serial No. 10-2009-0047334, the entire disclosure of which is hereby incorporated by reference.

BACKGROUND OF THE INVENTION

1. Field of the Invention

The present invention relates to a wireless communication system. More particularly, the present invention relates to an apparatus and a method for receiving a signal using a rake receiver and an equalizer.

2. Description of the Related Art

A transmission signal from a transmission end of a wireless communication system arrives at a reception end after experiencing a fading phenomenon with various delays under a multi-wireless path channel environment. The reception end may use a rake receiver and an equalizer in order to recover an original signal from a reception signal.

The reception end of the wireless communication system may demodulate signals received at different times via multipaths for respective paths, remove time delay, combine the signals of the respective paths, and decode the signals. Here, a unit for demodulating the multipath signals independently and combining the multipath signals is referred to as a rake receiver. The rake receiver includes a plurality of fingers for demodulating multipath signals for respective paths, and a multipath combiner for removing delay of signals demodulated for the respective paths, and combining them. Here, each finger of the rake receiver is considered as a 1-tap equalizer and regards a path maintained by each finger as one memory-free channel to channel-compensate for a signal received via the path. In contrast, the equalizer regards a multipath as a channel having one memory and channel-compensates for a signal received via the multipath.

Ideally, when data processing performances of the rake receiver and the equalizer are compared with each other, the performance of the equalizer would be better because the equalizer recovers an optimal original signal with consideration of all multipath signals, but a finger of the rake receiver recovers an original signal with consideration of only a signal from one path, so that multipath signals that have not been considered by the relevant finger function as interference. These interference signals are generally referred to as an Inter-Symbol Interference (ISI) or an Inter-Chip Interference (ICI) by multipaths. Therefore, a recovered signal output from each finger is recovered and combined without removing a multipath interference so that a Signal-to-Noise Ratio (SNR) deteriorates compared with an SNR of a recovered signal of the equalizer. That is, use of the equalizer has an advantage in view of reception performance.

However, the equalizer generally is considerably complex compared with that of the rake receiver and consumes more power. A method used for equalizing a channel at a reception end, a method realizing an equalizer as an adaptive filter, or a method for directly determining an inverse matrix of a channel may be used. Alternatively, a method for performing a Fast Fourier Transform (FFT) on a channel estimated by a reception end, and determining an inverse matrix of a channel in a frequency domain may be used. A considerable hardware resource is required for determining an inverse matrix of the channel. More particularly, when the memory size of a channel is large, a required hardware resource increases by geometric progression. Therefore, when realizing an equalizer, a memory size (i.e., a multipath delay length) of a channel is limited.

Under a wireless channel environment where a plurality of relays exist, or under a specific wireless channel environment such as a riverside, a multipath power delay profile exists somewhat long. In this case, when an equalizer having a limited memory size receives a signal, a signal that arrives somewhat late cannot be recovered and an interference signal increases. Accordingly, a performance loss is generated. In contrast, since a rake receiver is less influenced by delay of a wireless channel, when a memory size of a multipath combiner inside the rake receiver is large, a signal is reliably received. Accordingly, a performance loss is not experienced.

As described above, a reception end may recover an original signal from a reception signal using two reception methods (i.e., a method that uses a rake receiver, and a method that uses an equalizer). In using the two reception methods, an advantageous environment and a disadvantageous environment exist.

Therefore, a need exists for an apparatus and method for improving reception performance using a rake receiver and an equalizer in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for receiving a signal using a rake receiver and an equalizer in a wireless communication system.

Another aspect of the present invention is to provide an apparatus and a method for selecting an optimal receiver among a rake receiver and an equalizer depending on a varying wireless channel environment and demodulating a reception signal at a reception end of a wireless communication system.

Still another aspect of the present invention is to provide an apparatus and a method for effectively raising a reception performance by selecting an optimal receiver among a rake receiver and an equalizer depending on a varying wireless channel environment with consideration of a Signal-to-Noise Ratio (SNR), a movement velocity, and a demodulation capability of a reception end in a wireless communication system.

In accordance with an aspect of the present invention, a method for selecting a receiver for demodulating a reception signal at a reception end having a plurality of receivers is provided. The method includes determining a mean and a standard deviation of SNRs of the receivers, estimating a Doppler frequency, determining a statistical value of a modulation order of subframes received in advance, determining SNR estimation values of the receivers based on the determined mean and standard deviation of the receivers, the estimated Doppler frequency, and the determined statistical value of the modulation order of the received subframes, selecting one receiver having a largest SNR estimation value among the determined SNRs of the receivers, and demodulating a reception signal using the selected receiver.

In accordance with another aspect of the present invention, an apparatus for selecting a receiver for demodulating a reception signal at a reception end having a plurality of receivers is provided. The apparatus includes a Signal-to- Noise Ratio (SNR) determiner for determining a mean and a standard deviation of SNRs of the receivers, a Doppler frequency estimator for estimating a Doppler frequency, and a microprocessor for determining a statistical value of a modulation order of subframes received in advance, for determining SNR estimation values of the receivers based on the determined mean and standard deviation of the receivers, the estimated Doppler frequency, and the determined statistical value of the modulation degrees of the received subframes, for selecting one receiver having a largest SNR estimation value among the determined SNRs of the receivers, and for controlling the selected receiver to demodulate a signal received.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
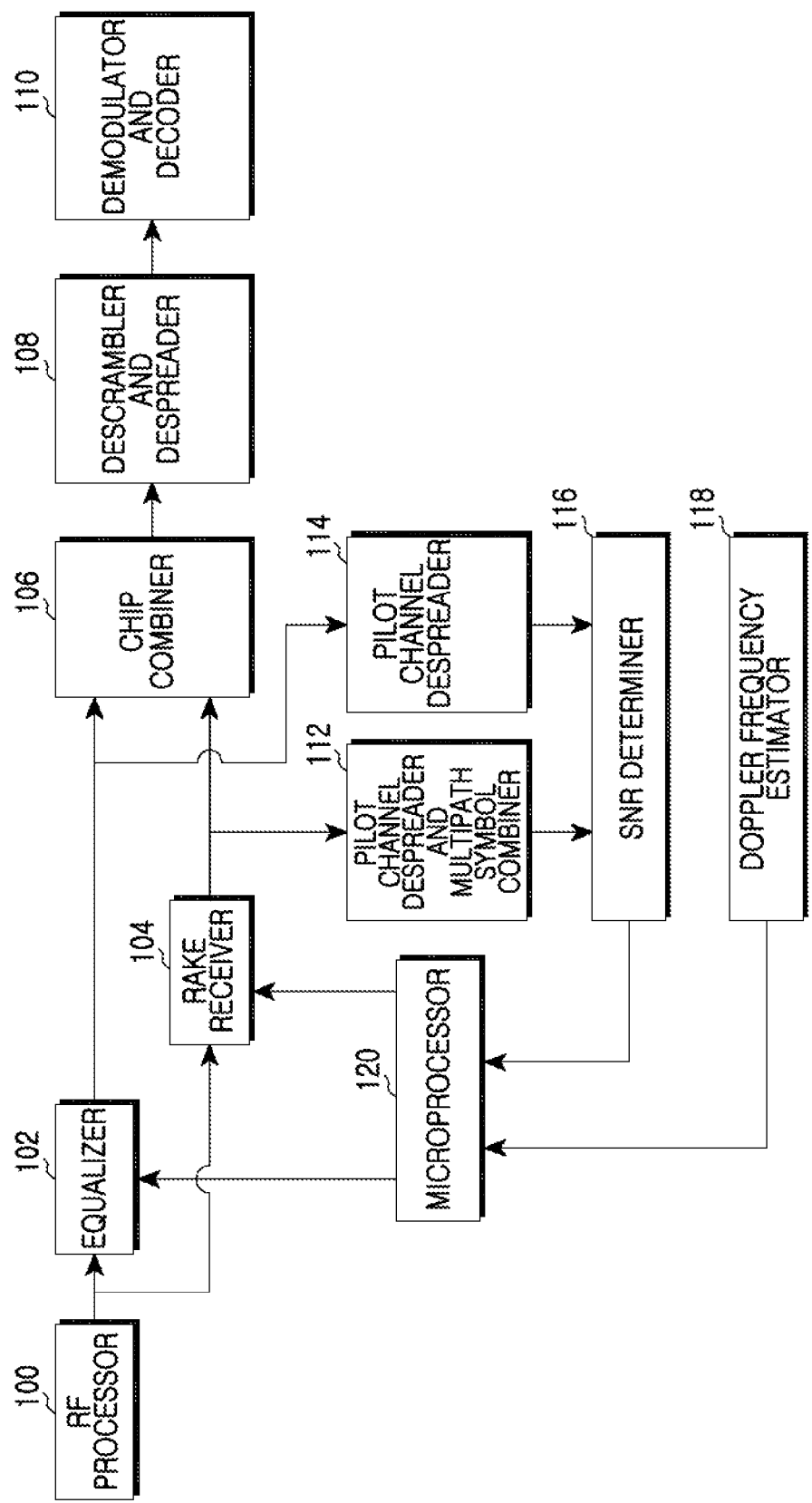
FIG. 1 is a block diagram illustrating a reception end in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for selecting an optimal receiver among a rake receiver and an equalizer depending on a varying wireless channel environment and demodulating a reception signal at a reception end of a wireless communication system. More particularly, exemplary embodiments of the present invention provide an apparatus and a method for selecting an optimal receiver among a rake receiver and an equalizer depending on a varying wireless channel environment with consideration of a Signal-to-Noise Ratio (SNR), a movement velocity, and a demodulation capability of a reception end.

The reception end is suitable for a reception end structure of a wireless communication system that requires high speed data transmission, such as Wideband Code Division Multiple Access (WCDMA) and High Speed Downlink Packet Access (HSDPA). Exemplary embodiments of the present invention are described using a CDMA-based wireless communication system as an example, and is applicable to a wireless communication system having both a rake receiver and an equalizer.

A transmission end of the related art converts desired information data into a data symbol and transmits the data symbol via a radio space when transmitting a signal. However, a transmission end of a CDMA-based wireless communication system transmits a chip stream obtained by multiplying a data symbol by a preset orthogonal code, for a multiple access function and reception sensitivity improvement, via a radio space. Therefore, a reception end recovers a reception signal in a chip level or a symbol level using a rake receiver or an equalizer. Here, it is assumed that a reception end selects an optimal receiver among a rake receiver and an equalizer, and recovers a reception signal in a chip level using the selected optimal receiver. The orthogonal code denotes a Walsh code.

FIG. 1 is a block diagram illustrating a reception end in a wireless communication system according to an exemplary embodiment of the present invention.

Referring to FIG. 1, the reception end includes a Radio Frequency (RF) processor 100, an equalizer 102, a rake receiver 104, a chip combiner 106, a descrambler and despreader 108, a demodulator and decoder 110, a pilot channel despreader and multipath symbol combiner 112, a pilot channel despreader 114, an SNR determiner 116, a Doppler frequency estimator 118, and a microprocessor 120.

The RF processor 100 down-converts an RF signal received from a transmission end via an antenna into a baseband signal, performs analog-to-digital conversion, and provides a CDMA chip stream to the equalizer 102 and the rake receiver 104.

The equalizer 102 determines a channel equalization filter coefficient using pilot channel information received from the transmission end, channel-compensates for a signal input to the equalizer 102 in a chip level using the determined channel equalization filter coefficient, and outputs the channel-compensated chip. The equalizer 102 uses an adaptive algorithm in order to determine a channel equalization filter coefficient. For example, a Least Mean Square (LMS) algorithm and a Recursive Least Square (RLS) algorithm may be used as the adaptive algorithm.

The rake receiver 104 includes a plurality of fingers for demodulating signals received at different times via multipaths for respective paths. Here, a finger of the rake receiver 104 channel-compensates for an input signal in a chip level, and outputs the channel-compensated chip.

The chip combiner 106 buffers a chip from the equalizer 102 and outputs the same, or synchronizes chips from the plurality of fingers inside the rake receiver 104, combines the chips, and outputs the same. On the other hand, a chip from the equalizer 102 may be combined with a chip from the rake receiver 104.

The descrambler and despreader 108 performs inverse operations of scrambling and spreading on a chip stream input from the chip combiner 106, and outputs a data symbol. The data symbol is a modulated symbol modulated using a modulation scheme such as Quadrature Phase Shift Keying (QPSK), 16 Quadrature Amplitude Modulation (QAM), and 64 QAM.

The demodulator and decoder 110 demodulates and decodes a modulated symbol input from the descrambler and despreader 108, and recovers original information data. Here, the decoding includes de-interleaving, rate de-matching, viterbi decoding, and turbo decoding.

The pilot channel despreader and multipath symbol combiner 112 despreads a chip stream output from the rake receiver 104 for each finger using an orthogonal code applied to a pilot channel to generate a pilot symbol for each path, combines a pilot symbol for each path, and outputs the same.

The pilot channel despreader 114 despreads a chip stream output from the equalizer 102 using an orthogonal code applied to a pilot channel to generate a pilot symbol, and outputs the generated pilot symbol. Here, since the equalizer 102 outputs a chip stream equalized for a multipath, a separate multipath symbol combiner is not required.

The SNR determiner 116 determines an SNR value of the rake receiver 104 using a pilot symbol input from the pilot channel despreader and multipath symbol combiner 112, determines an SNR value of the equalizer 102 using a pilot symbol input from the pilot channel despreader 114, determines a mean and a standard deviation of the determined SNRs of the rake receiver 104 and the equalizer 102, and provides them to the microprocessor 120.

The Doppler frequency estimator 118 estimates a channel based on a pilot signal received from a transmission end, obtains a phase change amount of a channel using an inner product or a differential vector of the estimated channel, estimates a Doppler frequency of a received signal based on the obtained channel phase change amount, and provides the estimated Doppler frequency to the microprocessor 120.

The microprocessor 120 receives a mean and a standard deviation of SNRs of the equalizer 102 and the rake receiver 104 from the SNR determiner 116. In addition, the microprocessor 120 receives an estimated Doppler frequency from the Doppler frequency estimator 118, and sets weights α and β for determining x and y which are SNR estimated values of the equalizer 102 and the rake receiver 104 based on the received Doppler frequency. The microprocessor 120 sets γ using a statistical value of a modulation order of a recently received subframe. Thereafter, the microprocessor 120 determines x and y which are SNR estimated values of the equalizer 102 and the rake receiver 104 using the mean and standard deviation of the SNRs of the equalizer 102 and the rake receiver 104, the weights α and β, and the statistical value γ, and compares the determined x with y. When the determined x is greater than y, the microprocessor 120 selects the equalizer 102 as an optimal receiver. When the determined x is not greater than y, the microprocessor 120 selects the rake receiver 104 as an optimal receiver, and operates the selected equalizer 102 or the rake receiver 104 to demodulate a reception signal.

Figure 2:
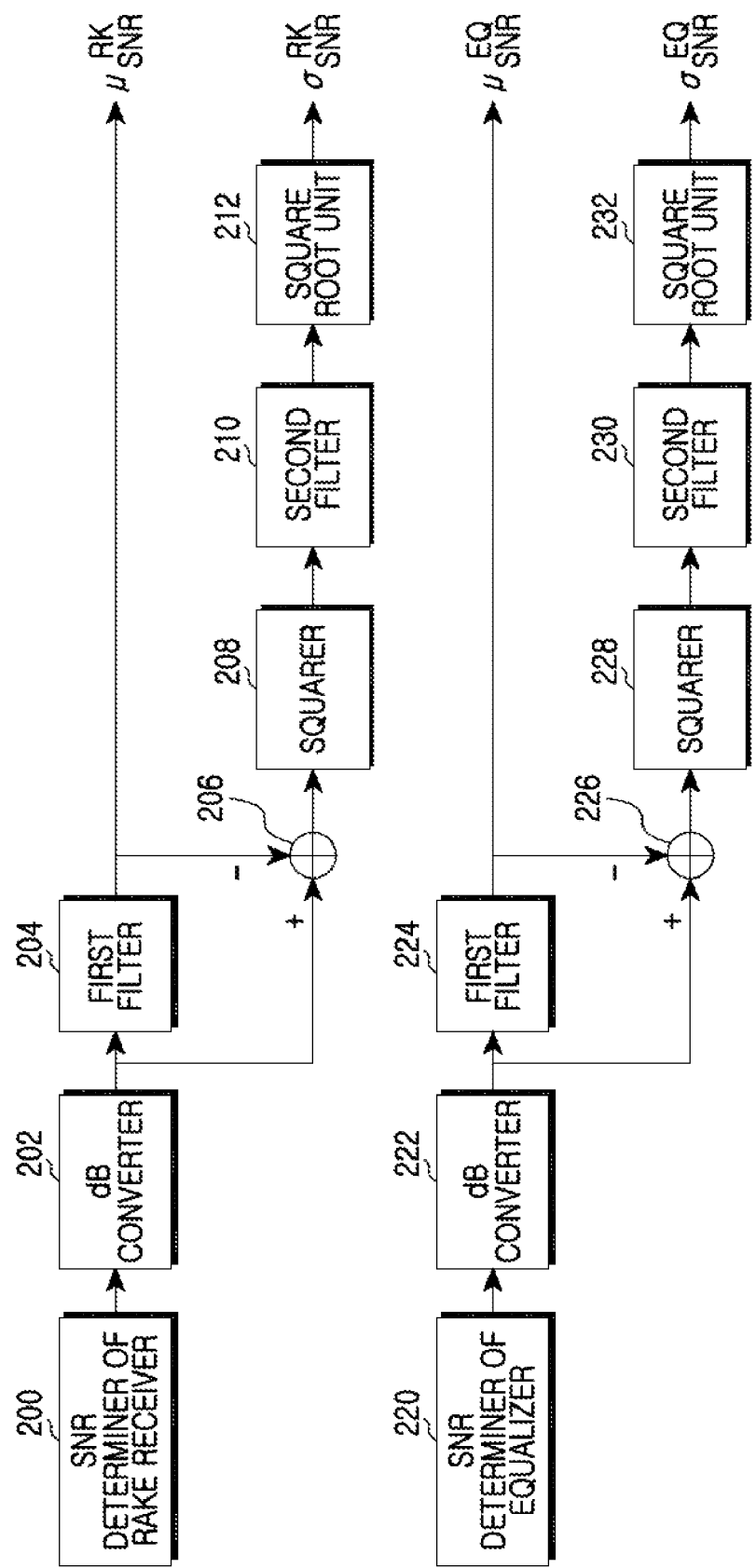
FIG. 2 is a block diagram illustrating in detail a Signal-to-Noise Ratio (SNR) determiner inside a reception end in a wireless communication system according to an exemplary embodiment of the present invention.

FIG. 2 is a block diagram illustrating in detail an SNR determiner inside a reception end in a wireless communication system according to an exemplary embodiment of the present invention.

Referring to FIG. 2, the SNR determiner includes a unit for determining a mean and a standard deviation of SNRs of the rake receiver, and a unit for determining a mean and a standard deviation of SNRs of the equalizer. Here, the unit for determining a mean and a standard deviation of SNRs of the rake receiver includes an SNR determiner 200 of the rake receiver, a dB converter 202, a first filter 204, an adder 206, a squarer 208, a second filter 210, and a square root unit 212. The unit for determining a mean and a standard deviation of SNRs of the equalizer includes an SNR determiner 220 of the equalizer, a dB converter 222, a first filter 224, an adder 226, a squarer 228, a second filter 230, and a square root unit 232.

Referring to FIG. 2, the SNR determiner 200 of the rake receiver determines an SNR of the rake receiver using an output chip of the rake receiver, and outputs the SNR of the rake receiver.

The SNR determiner 220 of the equalizer determines an SNR of the equalizer using the output chip of the equalizer, and outputs the SNR of the equalizer.

The dB converters 202 and 222 convert a unit of an SNR value input from the SNR determiner 200 of the rake receiver or the SNR determiner 220 of the equalizer into dB. The dB conversion is for facilitating determination and comparison of x and y values which are SNR estimated values of the equalizer and the rake receiver.

The first filters 204 and 224 filter dB-converted SNR values input from the dB converters 202 and 222, and determine a mean of the SNRs. That is, the first filter 204 determines $\mu_{SNR}^{RK}$, which is a mean of SNRs of the rake receiver, and the first filter 224 determines $\mu_{SNR}^{EQ}$, which is a mean of SNRs of the equalizer.

The adders 206 and 226 determine a difference between an instantaneous value of a dB-converted SNR value input from the dB converters 202 and 222, and a mean of dB-converted SNR values input from the first filters 204 and 224, and output the determined result.

The squarers 208 and 228 determine squares of determined results input from the adders 206 and 226, and output the determined result.

The second filters 210 and 230 filter determined results input from the squarers 208 and 228, and determine a mean of the determined results input from the squarers 208 and 228, and output the determined result.

The square root units 212 and 232 determine square roots of determined results input from the second filters 210 and 230, and determine the square root as a standard deviation of the SNR value. That is, the square root unit 212 determines $\sigma_{SNR}^{RK}$, which is a standard deviation of SNRs of the rake receiver, and the square root unit 232 determines $\sigma_{SNr}^{EQ}$, which is a standard deviation of SNRs of the equalizer.

Here, the first filters 204 and 224, or the second filters 210 and 230 may be realized using Equation (1).

$$z[n]=\lambda \cdot v[n]+(1-\lambda)\cdot z[n-1] \quad (1)$$

where z[n] is an output of a filter at a time n, v[n] is an input of the filter at a time n, and λ is a filter coefficient that determines a bandwidth of the filter. Also, λ of the first filters 204 and 224, or the second filters 210 and 230 may be different from each other. Here, λ may be changed with reference to a Doppler frequency (Doppler_freq), which is an output value of the Doppler frequency estimator of FIG. 1.

Figure 3:
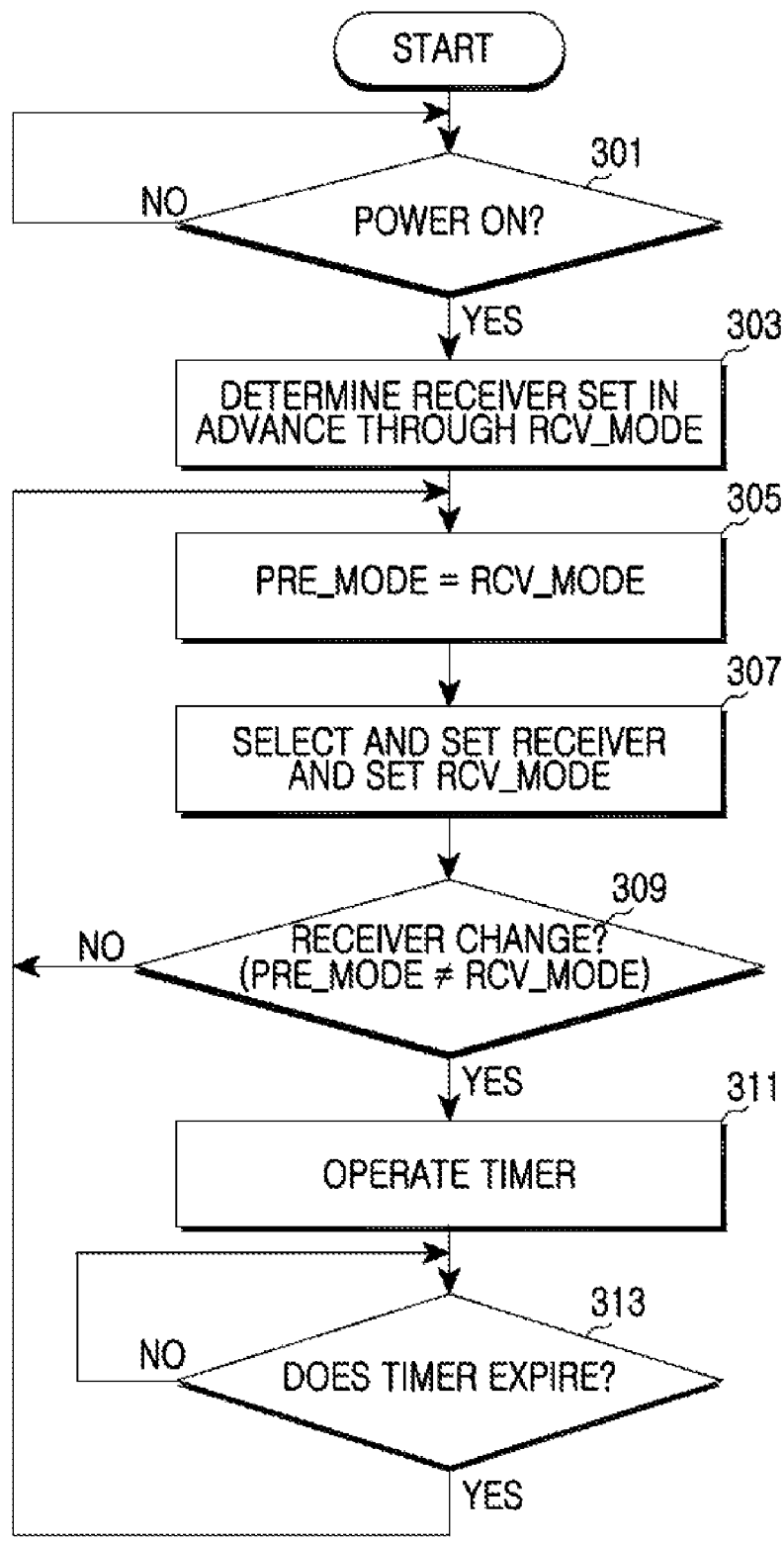
FIG. 3 is a flowchart illustrating a receiver operating method of a reception end having both a rake receiver and an equalizer in a wireless communication system according to an exemplary embodiment of the present invention.

FIG. 3 is a flowchart illustrating a receiver operating method of a reception end having both a rake receiver and an equalizer in a wireless communication system according to an exemplary embodiment of the present invention.

Referring to FIG. 3, the reception end determines whether the reception end itself is powered-on in step 301.

When the power-on is detected in step 301, the reception end determines a receiver set in advance in step 303. Here, the receiver set in advance may be determined through a reception mode (RCV_MODE) field. In the following description, for convenience in explanation, it is assumed that when the reception mode (RCV_MODE) field is set to '0', a currently set receiver is regarded as a rake receiver, and when the reception mode (RCV_MODE) field is set to '1', a currently set receiver is regarded as an equalizer. For example, a receiver whose power consumption is smaller than other receivers may be set in advance. Therefore, according to an exemplary embodiment of the present invention, a case where a rake receiver is set as the receiver in advance is exemplarily described. That is, a case where the reception mode (RCV_MODE) field is set to '0' is described. The reception end demodulates a reception signal using the receiver set in advance until a different receiver is selected and set. At this point, the rest of the receivers excluding the receiver set in advance do not operate.

The reception end sets a value set in the reception mode (RCV_MODE) field at a previous mode (PRE_MODE) field in step 305.

In step 307, the reception end selects a receiver depending on a varying wireless channel environment with consideration of an SNR value, a movement velocity, and a demodulation capability of a reception signal at the reception end. The reception end also sets the selected receiver, and sets the reception mode (RCV_MODE) field according to the selected and set receiver in step 307. The selecting of the receiver may be periodically performed, and a period thereof may be every subframe (i.e., 3 slots) in the case of an HSDPA-based wireless communication system. The above-determined reception mode (RCV_MODE) field provides selection of a receiver, and determines whether to operate each receiver and a demodulation path of a reception signal. Here, a process for selecting and setting the receiver and setting the reception mode (RCV_MODE) field according to the selected and set receiver is described in more detail below with reference to FIG. 4.

In step 309, the reception end determines whether the receiver set at the reception end has changed based on the selection of the receiver. That is, the reception end compares the previous mode (PRE_MODE) field with the reception mode (RCV_MODE) field, and determines whether values set in the two fields are different from each other.

When the receiver set at the reception end has changed based on the selection of the receiver in step 309, that is, when the values set in the previous mode (PRE_MODE) field and the reception mode (RCV_MODE) field are different from each other, the reception end operates a timer in step 311, and determines whether the timer has expired in step 313. The reception end demodulates a reception signal using the selected and set receiver until the timer has expired. At this point, the rest of the receivers excluding the selected and set receiver do not operate. When the timer has expired in step 313, the reception end returns to step 305 and repeatedly performs the subsequent steps. The operation of the timer provides temporal hysteresis, and prevents change of a receiver for a preset time after the change of the receiver is set at the reception end, so that a stable operation is achieved.

In contrast, when the receiver set at the reception end has not changed depending on the selection of the receiver in step 309, that is, when values set in the previous mode (PRE_MODE) field and the reception mode (RCV_MODE) field are the same, the reception end returns to step 305 and repeatedly performs the subsequent steps.

Figure 4:
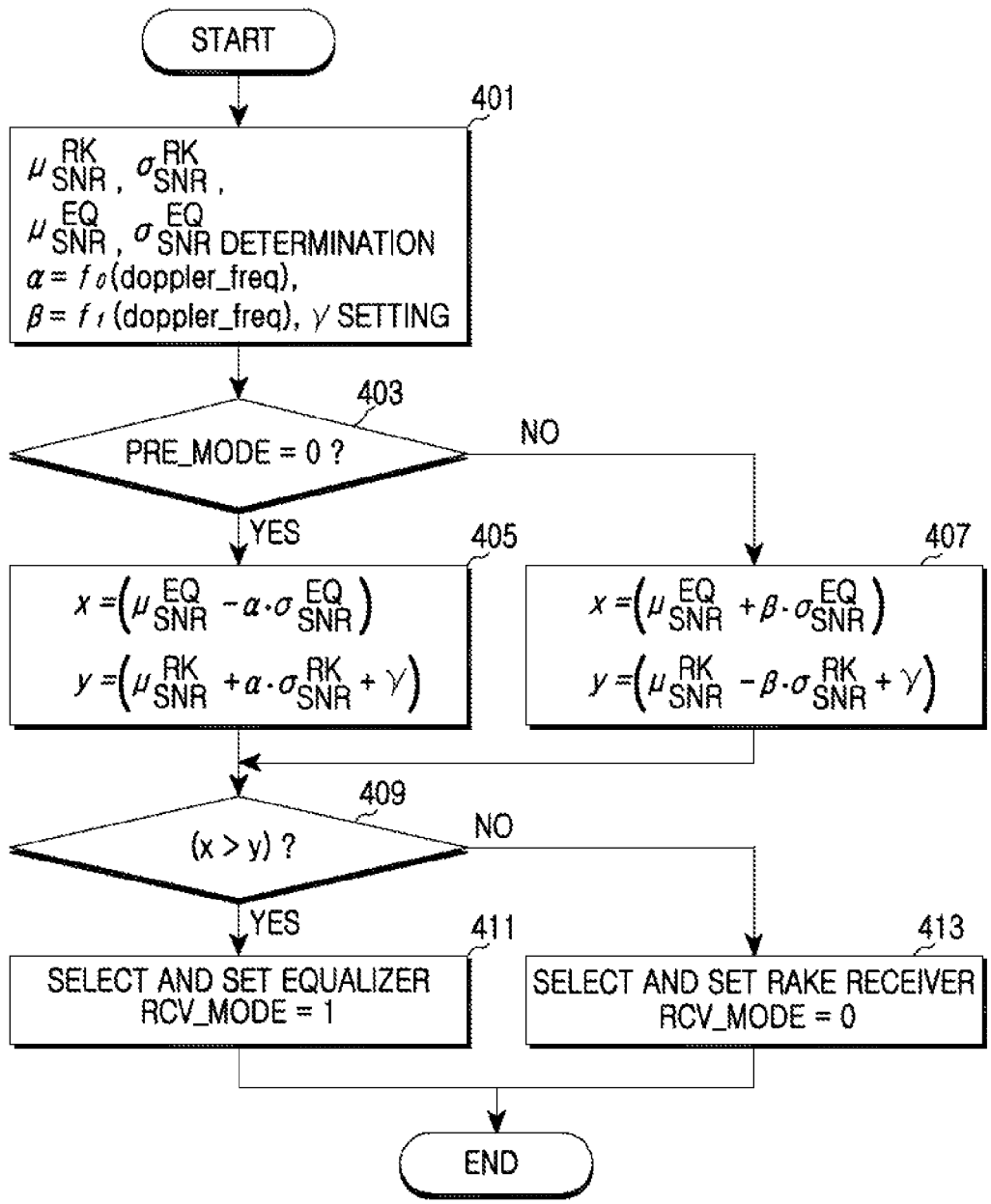
FIG. 4 is a flowchart illustrating an optimal receiver selecting method of a reception end having both a rake receiver and an equalizer in a wireless communication system according to an exemplary embodiment of the present invention.

FIG. 4 is a flowchart illustrating an optimal receiver selecting method of a reception end having both a rake receiver and an equalizer in a wireless communication system according to an exemplary embodiment of the present invention. Here, the reception end selects an optimal receiver among the rake receiver and the equalizer depending on a varying wireless channel environment with consideration of an SNR, a movement velocity, and a demodulation capability of a reception signal at the reception end.

Referring to FIG. 4, the reception end determines SNRs of the rake receiver and the equalizer, and determines a mean and a standard deviation of the determined SNRs of the rake receiver and the equalizer in step 401. That is, the reception end determines $\mu_{SNR}^{RK}$, which is a mean of SNRs of the rake receiver and $\sigma_{SNR}^{RK}$, which is a standard deviation of the SNRs of the rake receiver, and determines $\mu_{SNR}^{EQ}$, which is a mean of SNRs of the equalizer and $\sigma_{SNR}^{EQ}$, which is a standard deviation of the SNRs of the equalizer. Here, the reception end filters an instantaneous value of an SNR to determine a mean of the SNRs, squares a difference between an instantaneous value and a mean of an SNR, averages them through filtering, determines a square root thereof, and determines a standard deviation of the SNRs.

In addition, the reception end estimates a Doppler frequency of a reception signal based on a channel phase change amount, and sets weights α and β for determining x and y, which are SNR estimated values of the equalizer and the rake receiver, based on the estimated Doppler frequency in step 401.

Here, the Doppler frequency is used as a criterion expressing a movement velocity of the reception end or a change degree of a wireless channel. Generally, when the reception end moves at an arbitrary velocity, Doppler spread occurs at a reception signal according to the movement direction and the movement velocity. When the movement velocity of the reception end is fast, a maximum frequency of the Doppler spread increases. In contrast, when the reception end remains stationary and a neighboring environment is static, the Doppler spread does not occur. The Doppler frequency may be a maximum frequency of the Doppler spread, or a frequency having the largest component in the Doppler spread. Functions representing a change degree of the wireless channel are $f_0$ and $f_1$. For example, $f_0$ and $f_1$ may be simply represented as one mapping table as illustrated in Table 1.

TABLE 1

| doppler_freq [Hz] | α | β |
|---|---|---|
| 0~10 | 0.1 | 0.05 |
| 11~60 | 0.2 | 0.1 |

TABLE 1-continued

| doppler_freq [Hz] | α | β |
|---|---|---|
| 60~120 | 0.3 | 0.15 |
| 120~240 | 0.4 | 0.3 |
| 240~ | 1 | 0.5 |

Here, as represented in Table 1, when a wireless channel environment is somewhat dynamic (i.e., a movement velocity of the reception end is fast), weights α and β for determining x and y, which are SNR estimated values of the equalizer and the rake receiver are set large. When a wireless channel environment is somewhat static (i.e., a movement velocity of the reception end is slow), the weights α and β are set small. Here, α is set as a larger value than β. When the Doppler frequency increases, a difference between α and β increases even more. Alternatively, α and β may be set as the same value.

In addition, the reception end sets a statistical value γ of a modulation order of a recently received subframe in step 401. In the modulation order of the recently received subframe, when QPSK is the greatest, γ is set to a positive constant C, when 16 QAM is the greatest, γ is set to 0, and when 64 QAM is the greatest, γ is set to a negative constant −C. Here, the constant C may be properly determined depending on realization of the reception end.

The reception end determines whether a previous mode (PRE_MODE) field is set to '0' in step 403. That is, the reception end determines whether an existing set receiver is a rake receiver.

When the previous mode (PRE_MODE) field is set to '0', that is, the existing set receiver is the rake receiver in step 403, in step 405, the reception end determines x and y, which are SNR estimated values of the equalizer and the rake receiver, using the determined $\mu_{ANR}^{EQ}$, which is the mean of SNRs of the rake receiver and the determined $\sigma_{SNR}^{RK}$, which is the standard deviation of the SNRs of the rake receiver, the determined $\mu_{SNR}^{EQ}$, which is the mean of SNRs of the equalizer and the determined $\sigma_{SNR}^{EQ}$, which is the standard deviation of the SNRs of the equalizer, and the set weights α and γ. Here, x and y, which are the SNR estimated values of the equalizer and the rake receiver, are determined using Equation (2).

$$x = (\mu_{SNR}^{EQ} - \alpha \cdot \sigma_{SNR}^{EQ})$$

$$y = (\mu_{SNR}^{RK} + \alpha \cdot \sigma_{SNR}^{RK} + \gamma) \quad (2)$$

In contrast, when the previous mode (PRE_MODE) field is set to '1' in step 403, that is, the existing set receiver is an equalizer, in step 407, the reception end determines x and y, which are the SNR estimated values of the equalizer and the rake receiver, using the determined $\mu_{SNR}^{RK}$, which is the mean of SNRs of the rake receiver and the determined $\sigma_{SNR}^{RK}$, which is the standard deviation of the SNRs of the rake receiver, the determined $\mu_{SNR}^{EQ}$, which is the mean of SNRs of the equalizer, the determined $\sigma_{SNR}^{EQ}$, which is the standard deviation of the SNRs of the equalizer, and the set weights β and γ. Here, x and y, which are the SNR estimated values of the equalizer and the rake receiver, are determined using Equation (3).

$$x = (\mu_{SNR}^{EQ} + \beta \cdot \sigma_{SNR}^{EQ})$$

$$y = (\mu_{SNR}^{RK} - \beta \cdot \sigma_{SNR}^{RK} + \gamma) \quad (3)$$

The reception end determines whether x is greater than y by comparing the determined x with y in step 409.

When the determined x is greater than y in step 409, the reception end selects the equalizer as an optimal receiver, sets the selected equalizer, and sets the reception mode (RCV_MODE) field according to the selected and set equalizer in step 411. That is, the reception end sets the reception mode (RCV_MODE) field to '1'.

In contrast, when the determined x is not greater than y in step 409, the reception end selects the rake receiver as an optimal receiver, sets the selected rake receiver, and sets the reception mode (RCV_MODE) field according to the selected and set rake receiver in step 413. That is, the reception end sets the reception mode (RCV_MODE) field to '0'.

Here, when an SNR estimated value of each receiver is determined using only a mean ($\mu_{SNR}^{RK}, \mu_{SNR}^{EQ}$) of SNRs and when a mean of SNRs of the rake receiver is the same as a mean of SNRs of the equalizer, an optimal receiver may be frequently changed by a small change of an SNR (such a small change may occur due to a measurement error by a noise). In an exemplary implementation, to prevent the receiver from changing frequently and reliably select a receiver among the two receivers, SNR estimated values of the receivers are determined such that the existing set receiver has an advantage in selecting an optimal receiver.

That is, according to an exemplary embodiment of the present invention, an arbitrary value (i.e., $\alpha \cdot \sigma_{SNR}^{EQ} + \alpha \cdot \sigma_{SNR}^{RK} + \gamma$ or $\beta \cdot \sigma_{SNR}^{EQ} + \beta \cdot \sigma_{SNR}^{RK} + \gamma$) is added to a mean of SNRs of the existing set receiver, and the value is compared with a mean of SNRs of a receiver that has not been set. When the mean of the SNRs of the receiver that has not been set is greater than the value obtained by adding the arbitrary value to the mean of the SNRs of the existing set receiver, the receiver that has not been set is selected as an optimal receiver. In an opposite case, the existing set receiver is selected as an optimal receiver.

In addition, in determining SNR estimated values of the receivers, when the existing set receiver is a rake receiver, α is used as a weight as in Equation (2). When the existing set receiver is an equalizer, β, which is relatively smaller than α, is used as a weight as in Equation (3). Accordingly, the selecting of the rake receiver provides an optimal receiver. Furthermore, as shown in Table 1, as a Doppler frequency increases, a difference between α and β increases even more. When the Doppler frequency is greater rather than smaller, the rake receiver is further selected as an optimal receiver. When a Doppler frequency is large, a channel change is estimated as being large, which means that a new multipath may occur, or a change may be generated to a path delay of a channel. In this case, the rake receiver, and not the equalizer, may deal with a fast channel change through finger allocation. Therefore, it may be somewhat advantageous to demodulate a reception signal using the rake receiver and α and β may be set in Table 1 such that selecting the rake receiver as an optimal receiver is advantageous.

In determining the SNRs of the receivers, γ may be applied and γ may be applied to the rake receiver or the equalizer receiver with an opposite sign. In an exemplary implementation, γ is applied to the rake receiver.

As described above, when determining and comparing SNR estimated values of the receivers, the reception end provides a level hysteresis of an SNR according to a previous mode (PRE_MODE) field, thereby operating a receiver more stably.

Thereafter, the reception end ends an algorithm according to an exemplary embodiment of the present invention.

Figure 5:
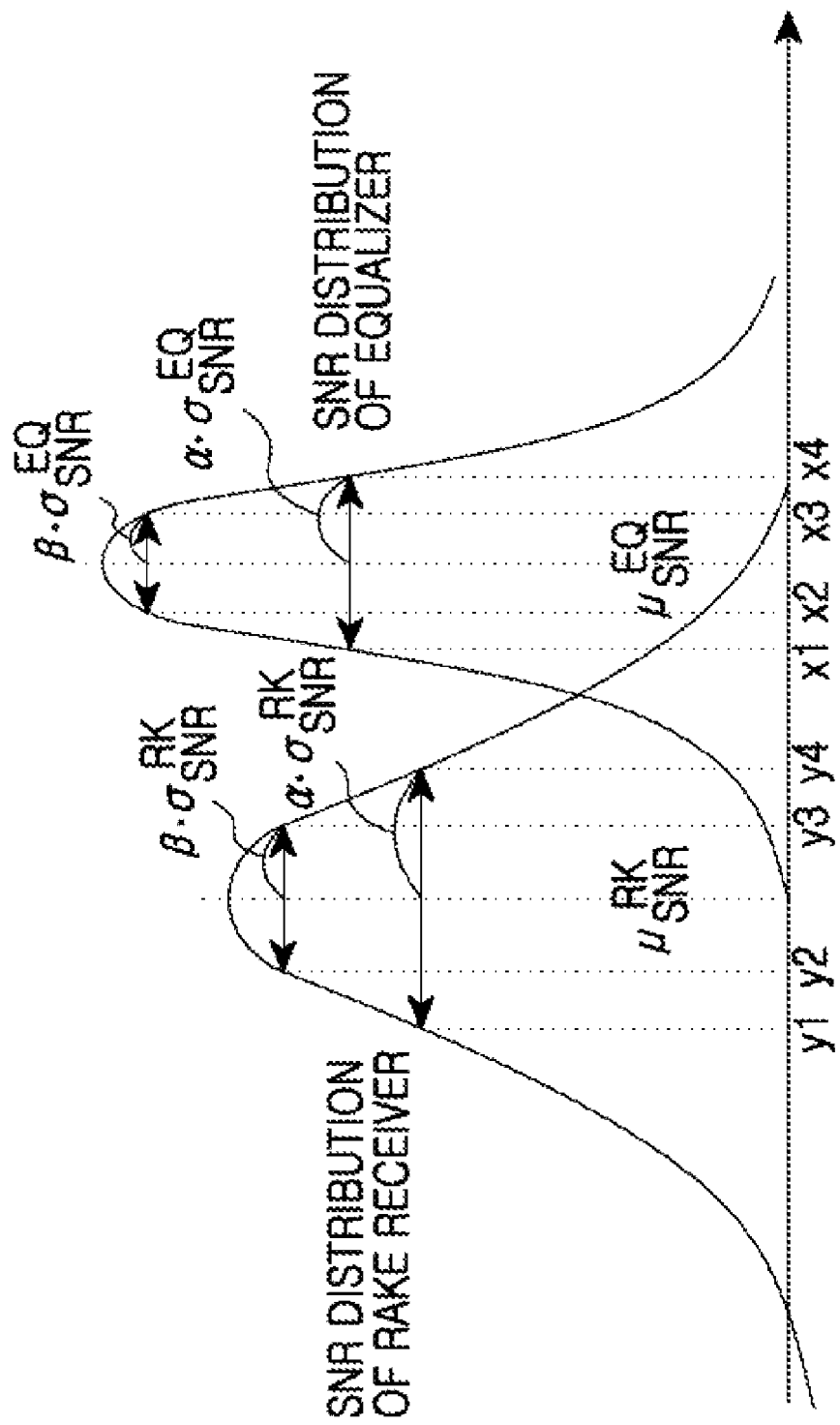
FIG. 5 is an exemplary view illustrating an SNR value distribution of a rake receiver and an equalizer in a wireless communication system according to an exemplary embodiment of the present invention.

FIG. 5 is an exemplary view illustrating an SNR value distribution of a rake receiver and an equalizer in a wireless communication system according to an exemplary embodiment of the present invention.

Referring to FIG. 5, x1~x4 are SNR estimated values of the equalizer, y1~y4 are SNR estimated values of the rake receiver. The SNR estimated values of the equalizer and the rake receiver may be represented in Equation (4). Here, is assumed to be 0 for convenience in description.

$$x1=(\mu_{SNR}^{EQ}-\alpha\cdot\sigma_{SNR}^{EQ}), y1=(\mu_{SNR}^{RK}-\alpha\cdot\sigma_{SNR}^{RK})$$

$$x2=(\mu_{SNR}^{EQ}-\beta\cdot\sigma_{SNR}^{EQ}), y2=(\mu_{SNR}^{RK}-\beta\cdot\sigma_{SNR}^{RK})$$

$$x3=(\mu_{SNR}^{EQ}+\beta\cdot\sigma_{SNR}^{EQ}), y3=(\mu_{SNR}^{RK}+\beta\cdot\sigma_{SNR}^{RK})$$

$$x4=(\mu_{SNR}^{EQ}+\alpha\cdot\sigma_{SNR}^{EQ}), y4=(\mu_{SNR}^{RK}+\alpha\cdot\sigma_{SNR}^{RK}) \quad (4)$$

FIG. 5 assumes that the existing set receiver is the rake receiver under an environment where a mean of SNRs of the equalizer is higher than a mean of SNRs of the rake receiver. Since the existing set receiver is the rake receiver, x1, which is an SNR estimated value of the equalizer, and y4, which is an SNR estimated value of the rake receiver, may be determined and compared. As illustrated in FIG. 5, when x1, which is an SNR estimated value of the equalizer, is greater than y4, which is an SNR estimated value of the rake receiver, the equalizer is selected as an optimal receiver. Accordingly, the receiver is changed from the rake receiver to the equalizer. In contrast, for example, when x1, which is an SNR estimated value of the equalizer, is not greater than y4, which is an SNR estimated value of the rake receiver, the rake receiver may be selected as an optimal receiver. Accordingly, the receiver, which is the rake receiver, may be maintained.

Although not illustrated, assuming that a mean of SNRs of the rake receiver is greater than a mean of SNRs of the equalizer, and an existing set receiver is the equalizer, since the existing set receiver is the equalizer, x3, which is an SNR estimated value of the equalizer, and y2, which is an SNR estimated value of the rake receiver, may be determined and compared. When x3, which is an SNR estimated value of the equalizer, is greater than y2, which is an SNR estimated value of the rake receiver, the equalizer may be selected as an optimal receiver. Accordingly, the receiver, which is the equalizer, may be maintained. In contrast, when x3, which is an SNR estimated value of the equalizer, is not greater than y2, which is an SNR estimated value of the rake receiver, the rake receiver may be selected as an optimal receiver. Accordingly, the receiver may be changed from the equalizer to the rake receiver.

As described above, according to exemplary embodiments of the present invention, a reception end of a wireless communication system has both a rake receiver and an equalizer, determines and compares SNR estimated values of the receivers depending on a varying wireless channel environment, and selects an optimal receiver for demodulating a subframe reception signal to be received in the future. Thereby, a reception performance is improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for selecting a receiver for demodulating a reception signal at a reception end including a plurality of receivers, the method comprising:
   determining a mean and a standard deviation of Signal-to-Noise Ratios (SNRs) of the receivers;
   estimating a Doppler frequency;
   determining a statistical value of a modulation order of subframes received in advance;
   determining SNR estimation values of the receivers based on the determined mean and standard deviation of the receivers, the estimated Doppler frequency, and the determined statistical value of the modulation order of the received subframes;
   selecting one receiver having a largest SNR estimation value among the determined SNRs of the receivers; and
   demodulating a reception signal using the selected receiver.

2. The method of claim 1, further comprising determining a previously selected receiver,
   wherein the SNRs of the receivers are determined according to the determined previously selected receiver.

3. The method of claim 2, wherein the plurality of receivers comprise at least one of an equalizer and a rake receiver.

4. The method of claim 3, wherein when the previously selected receiver comprises the rake receiver, SNR estimation values of the equalizer and the rake receiver are determined using the following equation:

$$x=(\mu_{SNR}^{EQ}-\alpha\cdot\sigma_{SNR}^{EQ})$$

$$y=(\mu_{SNR}^{RK}+\alpha\cdot\sigma_{SNR}^{RK}+\gamma)$$

where x and y denote SNR estimation values of the equalizer and the rake receiver, $\mu_{SNR}^{EQ}$ and $\sigma_{SNR}^{EQ}$ denote a mean and a standard deviation of SNRs of the equalizer, respectively, $\mu_{SNR}^{RK}$ and $\sigma_{SNR}^{RK}$ denote a mean and a standard deviation of SNRs of the rake receiver, respectively, $\alpha$ denotes a weight set based on the Doppler frequency, and $\gamma$ denotes a statistical value of a modulation order of subframes received in advance.

5. The method of claim 4, wherein the SNR estimation value of the rake receiver is determined by a pilot symbol input from a pilot channel despreader and a multipath symbol combiner.

6. The method of claim 5, wherein the selected receiver comprises the rake receiver when x is not greater than y.

7. The method of claim 3, wherein when the previously selected receiver comprises the equalizer, SNR estimation values of the equalizer and the rake receiver are determined using the following equation:

$$x=(\mu_{SNR}^{EQ}+\beta\cdot\sigma_{SNR}^{EQ})$$

$$y=(\mu_{SNR}^{RK}-\beta\cdot\sigma_{SNR}^{RK}+\gamma)$$

where x and y denote SNR estimation values of the equalizer and the rake receiver, $\mu_{SNR}^{EQ}$ and $\sigma_{SNR}^{EQ}$ denote a mean and a standard deviation of SNRs of the equalizer, respectively, $\mu_{SNR}^{RK}$ and $\sigma_{SNR}^{RK}$ denote a mean and a standard deviation of SNRs of the rake receiver, respectively, $\beta$ denotes a weight set based on the Doppler frequency, and $\gamma$ denotes a statistical value of a modulation order of subframes received in advance.

8. The method of claim 7, wherein the SNR estimation value of the equalizer is determined by a pilot symbol input from the pilot channel despreader.

9. The method of claim 8, wherein the selected receiver comprises the equalizer when x is greater than y.

10. An apparatus for selecting a receiver for demodulating a reception signal at a reception end including a plurality of receivers, the apparatus comprising:
    a Signal-to-Noise Ratio (SNR) determiner for determining a mean and a standard deviation of SNRs of the receivers;

a Doppler frequency estimator for estimating a Doppler frequency; and a microprocessor for determining a statistical value of a modulation order of subframes received in advance, for determining SNR estimation values of the receivers based on the determined mean and standard deviation of the receivers, the estimated Doppler frequency, and the determined statistical value of the modulation order of the received subframes, for selecting one receiver having a largest SNR estimation value among the determined SNRs of the receivers, and for controlling the selected receiver to demodulate a signal received.

11. The apparatus of claim 10, wherein the microprocessor determines a previously selected receiver, and determines the SNR estimation values of the receivers according to the determined previously selected receiver.

12. The apparatus of claim 11, wherein the plurality of receivers comprise at least one of an equalizer and a rake receiver.

13. The apparatus of claim 12, wherein when the previously selected receiver comprises the rake receiver, SNR estimation values of the equalizer and the rake receiver are determined using the following equation:

$$x=(\mu_{SNR}^{EQ}-\alpha \cdot \sigma_{SNR}^{EQ})$$

$$y=(\mu_{SNR}^{RK}+\alpha \cdot \sigma_{SNR}^{RK}+\gamma)$$

where x and y denote SNR estimation values of the equalizer and the rake receiver, $\mu_{SNR}^{EQ}$ and $\sigma_{SNR}^{EQ}$ denote a mean and a standard deviation of SNRs of the equalizer, respectively, $\mu_{SNR}^{RK}$ and $\sigma_{SNR}^{RK}$ denote a mean and a standard deviation of SNRs of the rake receiver, respectively, α denotes a weight set based on the Doppler frequency, and γ denotes a statistical value of a modulation order of subframes received in advance.

14. The apparatus of claim 13, wherein the SNR determiner determines the SNR estimation value of the rake receiver using a pilot symbol input from a pilot channel despreader and a multipath symbol combiner.

15. The apparatus of claim 14, wherein the selected receiver comprises the rake receiver when x is not greater than y.

16. The apparatus of claim 12, wherein when the previously selected receiver comprises the equalizer, SNR estimation values of the equalizer and the rake receiver are determined using the following equation:

$$x=(\mu_{SRN}^{EQ}+\beta \cdot \sigma_{SNR}^{EQ})$$

$$y=(\mu_{SNR}^{RK}-\beta \cdot \sigma_{SNR}^{RK}+\gamma)$$

where x and y denote SNR estimation values of the equalizer and the rake receiver, $\mu_{SNR}^{EQ}$ and $\sigma_{SNR}^{EQ}$ denote a mean and a standard deviation of SNRs of the equalizer, respectively, $\mu_{SNR}^{RK}$ and $\sigma_{SNR}^{RK}$ denote a mean and a standard deviation of SNRs of the rake receiver, respectively, β denotes a weight set based on the Doppler frequency, and γ denotes a statistical value of a modulation order of subframes received in advance.

17. The apparatus of claim 16, wherein the SNR determiner determines the SNR estimation value of the equalizer using a pilot symbol input from the pilot channel despreader.

18. The apparatus of claim 17, wherein the selected receiver comprises the equalizer when x is greater than y.

* * * * *